United States Patent
Bryan et al.

(10) Patent No.: US 10,936,995 B2
(45) Date of Patent: Mar. 2, 2021

(54) SYSTEMS AND METHODS FOR DETERMINING PRODUCTS THAT WERE MIS-SHIPPED AND/OR IMPROPERLY INVOICED OR UNINVOICED TO A RETAIL STORE

(71) Applicant: Walmart Apollo, LLC, Bentonville, AR (US)

(72) Inventors: Greg A. Bryan, Centerton, AR (US); Cristy C. Brooks, Cassville, MO (US); Benjamin D. Enssle, Bella Vista, AR (US); David B. Brightwell, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 398 days.

(21) Appl. No.: 15/884,010

(22) Filed: Jan. 30, 2018

(65) Prior Publication Data

US 2018/0253690 A1    Sep. 6, 2018

Related U.S. Application Data

(60) Provisional application No. 62/466,872, filed on Mar. 3, 2017.

(51) Int. Cl.
  *G06Q 10/08* (2012.01)
  *G06K 7/14* (2006.01)
(52) U.S. Cl.
  CPC ....... *G06Q 10/0875* (2013.01); *G06K 7/1413* (2013.01); *G06K 7/1417* (2013.01)

(58) Field of Classification Search
CPC .... G06Q 10/0875; G06Q 30/04; G06Q 10/08; G06Q 10/087; G06Q 10/0833
See application file for complete search history.

(56) References Cited

U.S. PATENT DOCUMENTS

| | | | |
|---|---|---|---|
| 3,705,410 A | 12/1972 | Kooy | |
| 6,954,736 B2 | 10/2005 | Menninger | |
| 8,464,947 B2 | 6/2013 | Swan | |
| 9,141,928 B2 | 9/2015 | Pothukuchi | |
| 9,230,250 B1* | 1/2016 | Parker | G06Q 30/0185 |
| 2001/0030232 A1 | 10/2001 | Piatek | |
| 2003/0216969 A1 | 11/2003 | Bauer | |
| 2004/0054607 A1* | 3/2004 | Waddington | G06Q 10/08 705/28 |
| 2004/0243452 A1 | 12/2004 | Barton | |

(Continued)

FOREIGN PATENT DOCUMENTS

JP    2016033747    3/2016

OTHER PUBLICATIONS

Sathyan, Jithesh, et al.; "A Comprehensive Guide to Enterprise Mobility"; CRC Press Taylor & Francis Group; 2012; 1 pg.

(Continued)

*Primary Examiner* — Florian M Zeender
*Assistant Examiner* — Whitney Poffenbarger
(74) *Attorney, Agent, or Firm* — Fitch, Even, Tabin & Flannery, LLP (57) ABSTRACT

In some embodiments, methods and systems for analyzing an inventory database and an accounting database of a retail store in order to detect products that were mis-shipped to the retail store, improperly invoiced to the retail store, and/or erroneously not invoiced to the retail store.

18 Claims, 3 Drawing Sheets

(56) References Cited

U.S. PATENT DOCUMENTS

| | | | | |
|---|---|---|---|---|
| 2006/0085294 A1* | 4/2006 | Boerner | ............... | G06Q 10/087 |
| | | | | 705/28 |
| 2013/0144757 A1* | 6/2013 | Bauer | .................. | G06K 7/0008 |
| | | | | 705/26.61 |
| 2015/0379317 A1* | 12/2015 | Kelly | ................... | G06Q 10/087 |
| | | | | 705/28 |
| 2015/0379366 A1* | 12/2015 | Nomura | ................... | G06K 9/46 |
| | | | | 382/203 |
| 2016/0232479 A1 | 8/2016 | Skaaksrud | | |
| 2016/0275441 A1 | 9/2016 | Barber | | |

OTHER PUBLICATIONS

PCT; App. No. PCT/US2018/020573; International Search Report and Written Opinion dated May 9, 2018.

\* cited by examiner

SYSTEMS AND METHODS FOR DETERMINING PRODUCTS THAT WERE MIS-SHIPPED AND/OR IMPROPERLY INVOICED OR UNINVOICED TO A RETAIL STORE

CROSS-REFERENCE TO RELATED APPLICATIONS

This application claims the benefit of U.S. Provisional Application No. 62/466,872, filed Mar. 3, 2017, which is incorporated herein by reference in its entirety.

TECHNICAL FIELD

This disclosure relates generally to the invoicing of products for receipt at a retail store, and in particular, to the detection of errors in the invoicing of the products to the retail store.

BACKGROUND

Large retail stores typically perform a self-audit once a year to ensure that their inventory databases are consistent with their accounting databases. It is not uncommon for a retail facility to hire a third party service to come into a retail store, and perform a physical audit of every product stocked in the retail store over the next several days, cross-checking the inventory of the products in stock to the invoice data associated with such products. Given the hundreds of thousands of products stocked at a single retail store, such audits are not only labor-intensive and expensive for the retailer, but can also result in a major inconvenience for the employees of the retail store who are attempting to stock products for day-to-day operation of the retail store. Furthermore, given the hundreds of thousands (if not millions) of units of products shipped to and sold at a retail facility throughout the year, the number of invoice-related errors that accumulates over the course of the year can be very large and it may be difficult to remedy such errors in bulk.

BRIEF DESCRIPTION OF THE DRAWINGS

Disclosed herein are embodiments of systems, devices, and methods pertaining to the invoicing of products for receipt at a retail store, and in particular, to the detection of errors in the invoicing of the products to the retail store. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein analyze an inventory database and an accounting database of a retail store in order to detect products at the retail store that were mis-shipped, mis-invoiced, or erroneously un-invoiced to the retail store.

In some embodiments, a system for detecting products at a retail store that were mis-shipped, mis-invoiced, or erroneously un-invoiced to the retail store includes an electronic scanning device configured to scan at least one product stocked in a stock room of the retail store or displayed on a sales floor of the retail store. The electronic scanning device is configured to detect a product identifier of the at least one product. The system further includes an electronic inventory management device including a processor-based control circuit and configured to receive, from the electronic scanning device, electronic data identifying the at least one product scanned by the electronic scanning device. The electronic inventory management device is configured to: obtain, from an electronic inventory database, electronic data representing inventory information associated with the at least one product for which identifying electronic data was received; obtain, from an electronic accounting database, electronic data representing invoice information associated with the at least one product for which identifying electronic data was received; compare the electronic data obtained from the electronic inventory database to the electronic data obtained from the electronic accounting database; determine whether the electronic data representing the inventory information associated with the at least one product for which identifying electronic data was received is consistent with the electronic data representing the invoice information associated with the at least one product for which identifying electronic data was received; and generate an alert, in response to a determination, by the electronic inventory management device that a discrepancy exists between the electronic data representing inventory information associated with the at least one product for which identifying electronic data was received and the electronic data representing invoice information associated with the at least one product for which identifying electronic data was received.

In some embodiments, a method for detecting products at a retail store that were mis-shipped, mis-invoiced, or erroneously un-invoiced to the retail store includes: scanning at least one product stocked in a stock room of the retail store or displayed on a sales floor of the retail store via an electronic scanning device configured to detect a product identifier of the at least one product; receiving, at an electronic inventory management device including a processor-based control circuit and from the electronic scanning device, electronic data identifying the at least one product scanned by the electronic scanning device; obtaining, via the electronic inventory management device and from an electronic inventory database, electronic data representing inventory information associated with the at least one product for which identifying electronic data was received; obtaining, via the electronic inventory management device and from an electronic accounting database, electronic data representing invoice information associated with the at least one product for which identifying electronic data was received; comparing, via the electronic inventory management device, the electronic data obtained from the electronic inventory database to the electronic data obtained from the electronic accounting database; determining, based on the comparing step, whether the electronic data representing the inventory information associated with the at least one product for which identifying electronic data was received is consistent with the electronic data representing the invoice information associated with the at least one product for which identifying electronic data was received; and generating an alert, via the electronic inventory management device, in response to a determination, by the electronic inventory management device that the determining step indicates a discrepancy between the electronic data representing inventory information associated with the at least one product for which identifying electronic data was received and the electronic data representing invoice information associated with the at least one product for which identifying electronic data was received.

Figure 1:
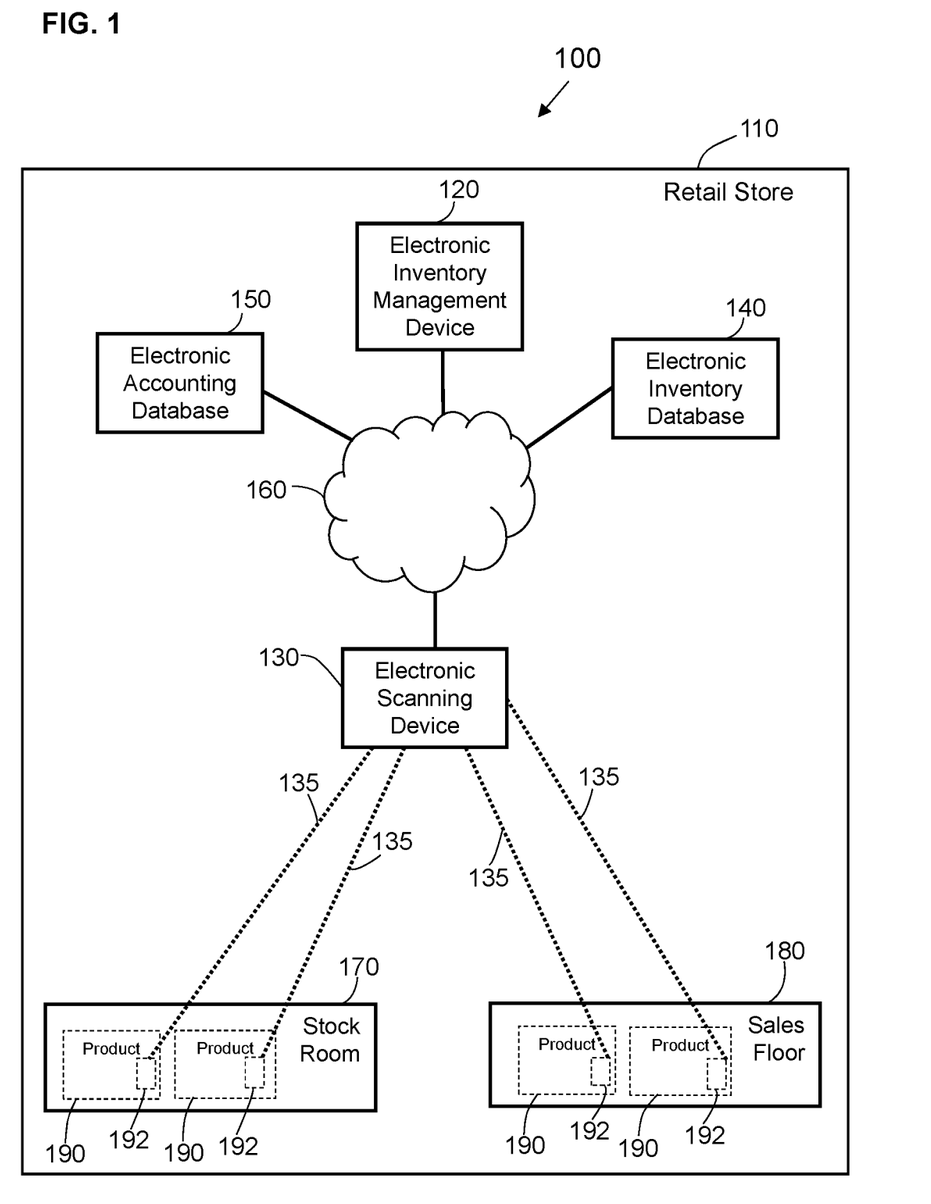
FIG. 1 is a diagram of a system for detecting products at a retail store that were mis-shipped, mis-invoiced, or erroneously un-invoiced to the retail store in accordance with some embodiments.

The exemplary system 100 in FIG. 1 includes an electronic inventory management device 120 configured generally to manage the inventory of products 190 stored in a stock room 170 of a retail store 110 and/or displayed on a sales floor 180 of the retail store 110. Specifically, the electronic inventory management device 120 is configured to manage and/or store electronic data associated with the products 190 in stock at the retail store 110, as well as worker tasks performed with respect to the products 190 at the retail store 110.

The electronic inventory management device 120 in FIG. 1 may be a stationary or portable electronic device, for example, a desktop computer, a laptop computer, a tablet, a mobile phone, or any other electronic device including a processor-based control unit (i.e., control circuit) and configured for data entry and one-way or two-way communication (e.g., over a network 160) with another device located at the retail store 110 (e.g., electronic scanning device 130, electronic inventory database 140, electronic accounting database 150, etc.), or with another device at a location remote to the retail store 110 (e.g., a remote server configured for communication with the electronic inventory management device 120 at the retail store 110).

The network 160 may be a wide-area network (WAN), a local area network (LAN), a personal area network (PAN), a wireless local area network (WLAN), or any other wired or wireless internet or intranet network, or combinations of such networks. Communication between various electronic devices of system 100 may take place over hard-wired, cellular, Wi-Fi or Bluetooth networked components, or the like. In some embodiments, one or more electronic devices of system 100 may include cloud-based features, such as cloud-based memory storage.

In the embodiment shown in FIG. 1, the system 100 includes an electronic scanning device 130 in two-way communication with the electronic inventory management device 120 over the network 160. In some embodiments, the scanning device 130 is an electronic hand-held scanner that may be carried around and used by workers at the retail store 110 to scan the products 190 located in the stock room 170 and/or on the sales floor 180 of the retail store 110. In some embodiments, the scanning device 130 is a stationary electronic scanner that is installed in the stock room 170 and/or on or above the sales floor 180 at the retail store 110 to scan the products 190 located in the stock room 170 and/or on the sales floor 180. In some embodiments, the scanning device 130 is an electronic unmanned vehicle (i.e., robot) that is configured to move (autonomously or while being remotely controlled) throughout the retail store 110 while scanning the products 190 located in the stock room 170 and/or on the sales floor 180.

In some embodiments, the electronic scanning device 130 is configured to scan one or more products 190 at the retail store 110, and more specifically, to scan one or more product identifiers 192 present on the products 190 or on the packaging of the products 190. In some embodiments, after the electronic scanning device 130 scans the identifiers 192 of the products 190 at the retail store 110, the electronic scanning device 130 in configured to transmit the electronic data including the product identifiers 192 of the scanned products 190 over the network 160 to the electronic inventory management device 120. Exemplary electronic scanning devices 130 may include, but are not limited to barcode (e.g., UPC, EAN, GTIN12, GTIN 13, or the like) readers, quick response (QR) code readers, radio frequency identification (RFID) readers, stock keeping unit (SKU) readers, near field communication (NFC) readers, video capture-enabled devices (e.g., cameras, smartwatches, glasses, or the like), electronic tablets, cellular phones, or the like mobile electronic devices. In the embodiment illustrated in FIG. 1, the electronic scanning device 130 may obtain electronic data associated with the scanned product 190 by communicating via a communication channel 135 (e.g., radio waves) with the unique product identifiers 192 (e.g., labels, tags, barcodes, RFIDs, SKUs, or the like) located on an exterior (or interior) of products 190 at the retail store 110, or on an exterior (or interior) of the packaging of the products 190.

With reference to FIG. 1, the electronic inventory management device 120 is coupled via the network 160 to an electronic inventory database 140 configured to store electronic information associated with the products 190 stocked at the retail store 110, as well as electronic information associated with worker tasks performed or scheduled to be performed by the workers of the retail store 110 with respect to the products 190. While the electronic inventory database 140 of the system 100 of FIG. 1 is illustrated as a separate device from the electronic inventory management device 120, it will be appreciated that the electronic inventory management device 120 and the electronic inventory management device 120 may be incorporated into one electronic device in some aspects. The electronic inventory database 140 may be stored, for example, on non-volatile storage media (e.g., a hard drive, flash drive, or removable optical disk) external or internal relative to the electronic inventory management device 120, or external or internal relative to computing devices separate from the electronic inventory management device 120.

Figure 2:
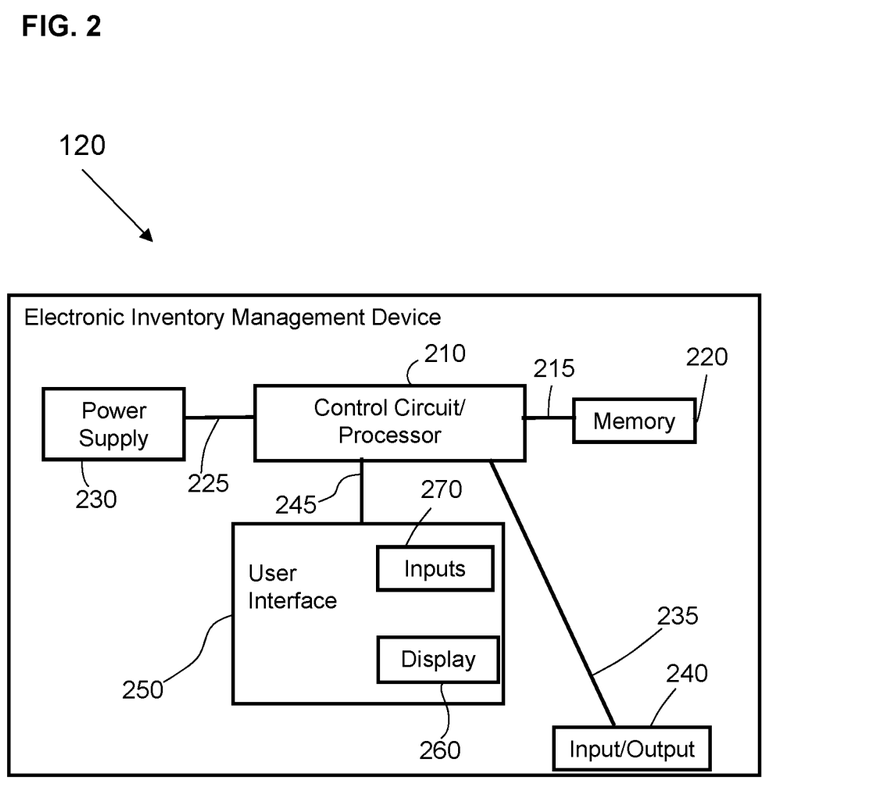
FIG. 2 is a functional block diagram of an electronic inventory management device in accordance with some embodiments.

In some embodiments, as described in more detail below, the electronic inventory database 140 may store electronic data including but not limited to product identification data indicating the unique product identifiers 192 of products 190 that are in stock at the retail store 110 (e.g., stored in the stock room 170, displayed on the sales floor 180, or located in another area (e.g., product receiving area) of the retail store 110. In some aspects, the electronic inventory database 140 is configured to store electronic data including but not limited to: an initial inventory of one or more products 190 at the retail store 110 at a start of a selected predetermined interval of time; a total number of units of the product 190 shipped to the retail store 110 from the start of the selected predetermined interval of time to a present time; a total number of units of the product 190 sold at the retail store 110 from the start of the selected predetermined interval of time to the present time; and a total number of units of the product 190 in stock at the retail store 110 at the present time. As will be discussed in more detail below, in some aspects, such data is obtained from the electronic inventory database 140 by the electronic inventory management device 120 and analyzed by the control circuit 210 of the electronic inventory management device 120.

In some embodiments, the electronic data indicating the unique product identifiers 192 associated with the products 190 in stock at the retail store 110 is received by (over the network 160) and stored in the electronic inventory database 140, for example, as a result of a scan of a product 190 at the retail store 110 via the electronic scanning device 130. For example, in some aspects, product identification data may be generated and transmitted via the network 160 to the electronic inventory database 140 (directly or via the electronic inventory management device 120) when a worker at a retail store 110 scans the product identifier 192 of a product 190 using the electronic scanning device 130, for example, when performing the task of walking near the shelves and/or bins in the stock room 170, or walking near the shelves on the sales floor 180 while scanning the products 190 stocked in the stock room 170 and/or on the sales floor 180. Similarly, in some aspects, product identification data may be generated and transmitted via the network 160 to the electronic inventory database 140 when a stationary electronic scanning device 130 installed in the stock room 170 and/or on the sales floor 180 of the retail store 110 (or a mobile (autonomous or remote-controlled) electronic scanning device 130) scans the product identifier 192 of a product 190 in the stock room 170 and/or on the sales floor 180 of the retail store 110.

With reference to FIG. 1, the electronic inventory management device 120 is coupled via the network 160 to an electronic accounting database 150 configured to store electronic accounting information associated with the products 190 stocked at the retail store 110. In some embodiments, as described in more detail below, the electronic accounting database 150 stores electronic data including but not limited to invoice data and/or shipping data associated with the products 190 in stock at the retail store 110 (e.g., stock room 170, sales floor 180, or another area of the retail store 110 (e.g., product receiving area)). In some aspects, the electronic accounting database 150 stores financial data including but not limited to: receipts/invoices relating to products 190 returned by customers to the retail store 110; receipts/invoices relating to products 190 sold at the retail store 110; receipts/invoices relating to products 190 that were transferred from one retail store 110 to another retail store 110; as well as receipts/invoices relating to broken products 190, product-related claims, donations, etc.

The electronic invoice data associated with the products 190 in stock at the retail store 110 can be received over the network 160 by the electronic accounting database 150. For example, the electronic invoice data can be transmitted to the electronic accounting database 150 for storage from sources including but not limited to: product distribution center, product warehouse, product manufacturer, product shipping company, and/or any other entity contracted to store products 190 prior to their delivery to the retail store 110 and/or contracted to cause the delivery of the products 190 to the retail store 110.

The electronic accounting database 150 may be stored, for example, on non-volatile storage media (e.g., a hard drive, flash drive, or removable optical disk) external or internal relative to the electronic inventory management device 120, or external or internal relative to computing devices (located at the retail store 110 or locations remote to the retail store 110) that are separate from the electronic inventory management device 120. While in the exemplary system 100 of FIG. 1, the electronic accounting database 150 is illustrated as a device that is separate from both the electronic inventory database 140 and the electronic inventory management device 120, it will be appreciated that, in some embodiments, the electronic accounting database 150 can be incorporated into one electronic device with the electronic inventory management device 120 and/or electronic inventory database 140.

With reference to FIG. 2, an exemplary electronic inventory management device 120 configured for use with exemplary systems and methods described herein may include a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 210 of the electronic inventory management device 120 is also electrically coupled via a connection 235 to an input/output 240 that can receive, over the network 160, signals from the electronic scanning device 130 and/or electronic inventory database 140 and/or electronic accounting database 150, and/or other electronic devices local to the retail store 110 or remote to the retail store 110. The input/output 240 of the electronic inventory management device 120 can also send, over the network 160, signals to the electronic scanning device 130 and/or electronic inventory database 140 and/or electronic accounting database 150, and/or other electronic devices local to the retail store 110 or remote to the retail store 110

In FIG. 2, the processor-based control circuit 210 of the electronic inventory management device 120 is electrically coupled via a connection 245 to a user interface 250, which may include a visual display or display screen 260 (e.g., light-emitting diode (LED) screen) and/or button input 270 that provide the user interface 250 with the ability to permit an operator of the electronic inventory management device 120 to manually control the electronic inventory management device 120 by inputting commands via touch-screen and/or button operation and/or voice commands. For example, in some embodiments, the user interface 250 permits a user to adjust perpetual inventory at the retail store 110 after the control circuit 210 of the electronic inventory management device 120 determines that an adjustment to perpetual inventory in the electronic inventory database 140 is warranted in view of a discrepancy (detected by the control circuit 210) between the inventory information associated with one or more products 190 scanned by the electronic scanning device 130 and the invoice information associated with such products 190. It will be appreciated that the performance of such functions by the processor-based control circuit 210 is not dependent on a human operator, and that the control circuit 210 may be programmed to perform such functions without a human operator.

As further discussed below, in some aspects, the control circuit 210 of the electronic inventory management device 120 is programmed to perform various functions associated with determining whether the inventory data associated with the products 190 in stock at the retail store 110 is consistent with the invoice data associated with the products in stock at the retail store 110. In some embodiments, the electronic inventory management device 120 is configured to receive, for example, from the electronic scanning device 130, electronic data (e.g., product identifier 192) indicating the identity of the products 190 stocked at the retail store 110. The control circuit 210 of the electronic inventory management device 120 is also programmed to obtain, from the electronic inventory database 140, electronic data representing inventory information associated with the products 190 for which identifying electronic data was received from the electronic scanning device 130. Similarly, the control circuit 210 of the electronic inventory management device 120 is also programmed to obtain, from the electronic accounting database 150, electronic data representing invoice information associated with the products 190 for which identifying electronic data was received from the electronic scanning device 130.

In some aspects, since the electronic inventory data for a product 190 stored in the electronic inventory database 140 is stored in association with identifying data (e.g., a product identifier 192 such as a barcode, QR code, RFID, etc.) for that product 190, the product identifier 192 transmitted to the electronic inventory management device 120 from the electronic scanning device 130 permits the electronic inventory management device 120 to query the electronic inventory database 140 using the product identifier 192 of this product 190 in order to obtain the electronic inventory data (e.g., number of units of the product in stock at the retail store 110) associated with the product 190 via the product identifier 192. Similarly, since the electronic accounting data for the product 190 stored in the electronic accounting database 150 is stored in association with the identifying data (e.g., a product identifier 192 such as a barcode, QR code, RFID, etc.) for that product 190, the product identifier 192 transmitted to the electronic inventory management device 120 from the electronic scanning device 130 permits the electronic inventory management device 120 to query the electronic accounting database 150 using the product identifier 192 of this product 190 in order to obtain the electronic accounting data (e.g., an invoice) associated with the product 190 via the product identifier 192.

In some aspects, the control circuit 210 of the electronic inventory management device 120 is configured to compare the electronic inventory data for a given product 190 obtained from the electronic inventory database 140 to the electronic accounting data for that product 190 obtained from the electronic accounting database 150 in order to determine whether the electronic data representing the inventory information associated with this product 190 is consistent with the electronic data representing invoice information associated with the product 190. In particular, the control circuit 210 of the electronic inventory management device 120 is programmed to correlate the electronic inventory data for a given product 190 to the electronic accounting data for that product 190 and detect discrepancies between the electronic inventory data for the product 190 and the electronic accounting data associated with the product 190.

By way of example only, the control circuit 210 of the electronic inventory management device 120 is programmed to interpret the fact that no electronic invoice is stored in the electronic accounting database 150 in association with the product 190 scanned via the electronic scanning device 130 on the sales floor 180 of the retail store 110 as a discrepancy between the electronic inventory information and the electronic accounting information for that product 190. In another example, the control circuit 210 of the electronic inventory management device 120 is programmed to interpret the fact that the electronic invoice stored in the electronic accounting database 150 in association with the product 190 scanned via the electronic scanning device 130 on the sales floor 180 of the retail store 110 indicates that the product 190 was invoiced to a different retail store (i.e., not to the retail store 110 where the product 190 was stocked and scanned by the electronic scanning device 130) as a discrepancy between the electronic inventory information and the electronic accounting information for that product 190. In yet another example, the control circuit 210 of the electronic inventory management device 120 is programmed to interpret the fact that the electronic invoice stored in the electronic accounting database 150 in association with the product 190 (e.g., mouse pad) scanned via the electronic scanning device 130 on the sales floor 180 of the retail store 110 reflects invoice information for a product (e.g., coaster) that is different from the product 190 that was scanned at the retail store 110 by the electronic scanning device 130 as a discrepancy between the electronic inventory information and the electronic accounting information for that product 190.

In yet another example, the control circuit 210 of the electronic inventory management device 120 is programmed to interpret the fact that the electronic invoice stored in the electronic accounting database 150 in association with the product 190 (e.g., mouse pad) scanned via the electronic scanning device 130 on the sales floor 180 of the retail store 110 reflects invoice information for a product (e.g., coaster) that is different from the product 190 that was scanned at the retail store 110 by the electronic scanning device 130 as a discrepancy between the electronic inventory information and the electronic accounting information for that product 190. In yet another example, the control circuit 210 of the electronic inventory management device 120 is programmed to interpret the fact that the electronic invoice stored in the electronic accounting database 150 in association with the product 190 scanned via the electronic scanning device 130 on the sales floor 180 of the retail store 110 reflects that the product does not logically belong at the retail store 110 (e.g., the product 190 is a snow shovel and the invoice indicates that the retail store 110 is located in Miami) as a discrepancy between the electronic inventory information and the electronic accounting information for that product 190.

In some embodiments, in response to a determination by the control circuit 210 of the electronic inventory management device 120 that a discrepancy exists between the electronic data representing inventory information associated with a product 190 scanned at the retail store 110 by the electronic scanning device 130 and the electronic data representing invoice information associated with this product 190, the control circuit 210 of the electronic inventory management device 120 is configured to output an alert, which may be a visual or an audible alert. In some aspects, the control circuit 210 of the electronic inventory management device 120 is programmed to generate an audible alarm (e.g., via the speaker 280 of the electronic inventory management device 120) indicating that the inventory information for a product 190 in stock at the retail store 110 is inconsistent with the invoice information associated with that product 190, or that no invoice information exists for that product 190. In other aspects, the control circuit 210 of the electronic inventory management device 120 is configured to generate a visible alarm (e.g., via the display 260 of the electronic inventory management device 120) instead or in addition to the audible alarm.

In some embodiments, after the control circuit 210 of the electronic inventory management device 120 generates an alarm, the control circuit 210 is programmed to cause the electronic inventory management device 120 to transmit a signal over the network 160 to the electronic inventory database 140 to record the alarm event and/or to update the on-hand inventory of the product 190 for which a discrepancy between the inventory and invoice data was detected. For example, in one aspect, the control circuit 210 of the electronic inventory management device 120 is programmed to: (1) analyze invoice information associated with one or more products 190 scanned by the electronic scanning device 130 at the retail store 110; (2) detect, in the invoice information, an indication that the invoice information is invalid with respect to the retail store 110 where this product 190 was scanned by the electronic scanning device 130; and (3) adjust, in the electronic inventory database 140, the inventory information associated with this product 190 in order to correct for the detected invalid invoice information.

For example, if, as discussed above, the invoice information for the product 190 reflects that the price invoiced to the retail store 110 for a product 190 that should have cost $9.99 per unit was $99.99 by unit (e.g., as a result of an inadvertent typographical error during generation of the invoice), the control circuit 210 of the electronic inventory management device 120 is programmed to transmit a signal to the electronic accounting database 150 such that the electronic accounting database 150 is updated in order to correct the detected invoice error. In some aspects, the control circuit 210 of the electronic inventory management device 120 is also programmed to transmit an electronic notification of the detected invoice error to the agency responsible for generating the erroneous invoice, and requesting for a correct invoice to be generated.

In another aspect, the control circuit 210 of the electronic inventory management device 120 is programmed to: (1) analyze invoice information associated with a product 190 scanned by the electronic scanning device 130; (2) detect, in the invoice information, an indication that the invoice information does not reflect that this product 190 was invoiced to the retail store 110; and (3) adjust, in the electronic inventory database 140, the inventory information associated with this product 190 in order to correct for a lack of an invoice for this product 190 to the retail store 110. For example, when the electronic inventory management device 120 detects that the product 190 scanned via the electronic scanning device 130 at the retail store 110 has not been invoiced at all to the retail store 110, the control circuit 210 of the electronic inventory management device 120 is programmed to transmit an electronic notification to the agency responsible for generating the appropriate invoice, and requesting for an invoice to be generated.

In some embodiments, the control circuit 210 of the electronic inventory management device 120 is configured to obtain from the electronic inventory database 140 electronic data representing one or more of: an initial inventory of one or more products 190 at the retail store 110 at a start of a selected predetermined interval of time (e.g., 13 weeks; 26 weeks, 39 weeks; 52 weeks, etc.); a total number of units (e.g., 10, 50, 100, 500, 1000, etc.) of the product 190 shipped to the retail store 110 from the start of the selected predetermined interval of time to a present time; a total number of units (e.g., 5, 25, 50, 250, 500, etc.) of the product 190 sold at the retail store 110 from the start of the selected predetermined interval of time to the present time; and a total number of units (e.g., 5, 25, 50, 250, 500, etc.) of the product 190 in stock at the retail store 110 at the present time. In one aspect, after such data is obtained by the electronic inventory management device 120 over the network 160 from the electronic inventory database 140, the control circuit 210 of the electronic inventory management device 120 is programmed to perform a calculation in order to determine whether certain products 190 in stock at the retail store 110 are uninvoiced and/or improperly invoiced.

Specifically, in one aspect, the control circuit 210 of the electronic inventory management device 120 is programmed to: (1) add the initial inventory of one or more products 190 at the retail store 110 at a start of a selected predetermined interval of time to the total number of units of the product 190 shipped to the retail store 110 from the start of the selected predetermined interval of time to a present time to obtain a first sum; (2) add the total number of units of the product 190 sold at the retail store 110 from the start of the selected predetermined interval of time to the present time to the total number of units of the product 190 in stock at the retail store 110 at the present time to obtain a second sum; and (3) and compare the first sum to the second sum. As discussed above, such inventory data can be obtained by the electronic inventory management device 120 from the electronic inventory database 140. After performing such calculations, if the second sum is greater than the first sum, the control circuit 210 is programmed to determine that the electronic data representing the inventory information associated with the product 190 for which identifying electronic data was received is not consistent with the electronic data representing the invoice information associated with this product 190. By the same token, if the second sum is less than the first sum, the control circuit 210 is programmed to determine that the electronic data representing inventory information associated with the product 190 for which identifying electronic data was received is consistent with the electronic data representing invoice information associated with this product 190.

In one example, with respect to calculating the first sum, if the predetermined interval of time analyzed by the control circuit 210 of the electronic inventory management device 120 was 13 weeks (i.e., one quarter of a year), and the initial inventory of a product 190 at the retail store 110 at the start of this interval was 100 units, and the number of units of this product 190 shipped to the retail store 110 from the start of this interval to the present time was 50 units, the first sum calculated by the control unit 210 is 100+50=150. With respect to calculating the second sum, if the total number of units of the product 190 sold at the retail store 110 from the start of the predetermined 13 week interval was 75 units and the total number of units of the product 190 in stock at the retail store 110 at the present time is 50, then the second sum calculated by the control unit is 75+50=125. As such, in this example, the first sum is greater than the second sum, and the control circuit 210 of the electronic inventory management device 120 determines that the electronic data representing inventory information associated with the product 190 for which identifying electronic data was received is consistent with the electronic data representing invoice information associated with this product 190.

In another example, with respect to calculating the first sum, if the predetermined interval of time analyzed by the control circuit 210 of the electronic inventory management device 120 was 26 weeks (i.e., two quarters of the year), and the initial inventory of a product 190 at the retail store 110 at the start of this interval was 500 units, and the number of units of this product 190 shipped to the retail store 110 from the start of this interval to the present time was 250 units, the first sum calculated by the control unit 210 is 500+250=750. With respect to calculating the second sum, if the total number of units of the product 190 sold at the retail store 110 from the start of the predetermined 26 week interval was 500 units and the total number of units of the product 190 in stock at the retail store 110 at the present time is 300, then the second sum calculated by the control unit is 500+300=800. As such, in this example, the first sum is less than the second sum, and the control circuit 210 of the electronic inventory management device 120 determines that the electronic data representing inventory information associated with the product 190 for which identifying electronic data was received is not consistent with the electronic data representing invoice information associated with this product 190. In other words, in this second example, it appears that there is an invoice discrepancy with respect to 50 units of the product 190.

The calculations described above represent just one way of determining whether the electronic accounting data associated with the products 190 in stock at the retail store 110 is consistent with the electronic inventory data associated with such products 190. For example, in some embodiments, the control circuit 210 of the electronic inventory management device 120 is programmed to: (1) obtain electronic data indicating a total number of units of a product 190 in stock at the retail store 110 (and scanned by the electronic scanning device 130) at the present time and a cost to the retail store 110 associated with each of the units of the product 190 in stock at the retail store 110; and (2) obtain electronic data indicating a total book inventory amount associated with the units of this product 190. The term "book inventory" will be understood to refer to financial records that represent an accounting ledger of the retail store 110.

In one aspect, after the control circuit 210 of the electronic inventory management device 120 obtains such data, the control circuit 210 is programmed to subtract a product of the total number of units of the product 190 in stock at the retail store 110 at the present time and the cost to the retail store 110 associated with each of the units of this product 190 from the total book inventory amount associated with the units of this product 190. When the above-described subtracting step results in a number less than zero, the control circuit 210 of the electronic inventory management device 120 is programmed to determine that the electronic data representing electronic inventory information associated with the product 190 is not consistent with the electronic data representing electronic invoice information associated with this product 190. Conversely, when this subtracting step results in zero, the control circuit 210 of the electronic inventory management device 120 is programmed to determine that the electronic data representing electronic inventory information associated with this product 190 is consistent with the electronic data representing electronic invoice information associated with this product 190.

In one example, if the data obtained from the electronic inventory database 140 indicates that a total number of units of the product 190 in stock at the retail store 110 at the present time is 100 and the data obtained from the electronic accounting database 150 indicates that the cost to the retail store 110 to obtain each unit of the product 190 was $10 the resulting product (P) of these two factors is 100*10=1000. If the data obtained from the electronic inventory database 140 indicates a total book inventory amount of $1000, the resulting subtraction of the product P from the book inventory amount results in 1000−1000=0, and the control circuit 210 of the electronic inventory management device 120 is programmed to determine that the electronic data representing electronic inventory information associated with this product 190 is consistent with the electronic data representing electronic invoice information associated with this product 190.

In another example, if the data obtained from the electronic inventory database 140 indicates that a total number of units of the product 190 in stock at the retail store 110 at the present time is 90 and the data obtained from the electronic accounting database 150 indicates that the cost to the retail store 110 to obtain each unit of the product 190 was $10, the resulting product (P) of these two factors is 90*10=900. If the data obtained from the electronic inventory database 140 indicates a total book inventory amount of $1000, the resulting subtraction of the product P from the book inventory amount results in 900−1000=−100, and the control circuit 210 of the electronic inventory management device 120 is programmed to determine that the electronic data representing electronic inventory information associated with this product 190 is not consistent with the electronic data representing electronic invoice information associated with this product 190. In other words, in this example, an adjustment amount of $100 to book inventory is necessary, and the control circuit 210 of the electronic inventory management device 120 is programmed to make this adjustment to the book inventory in the electronic accounting database 150 in order to correct the discrepancy that was detected based on the above-described calculation.

Figure 3:
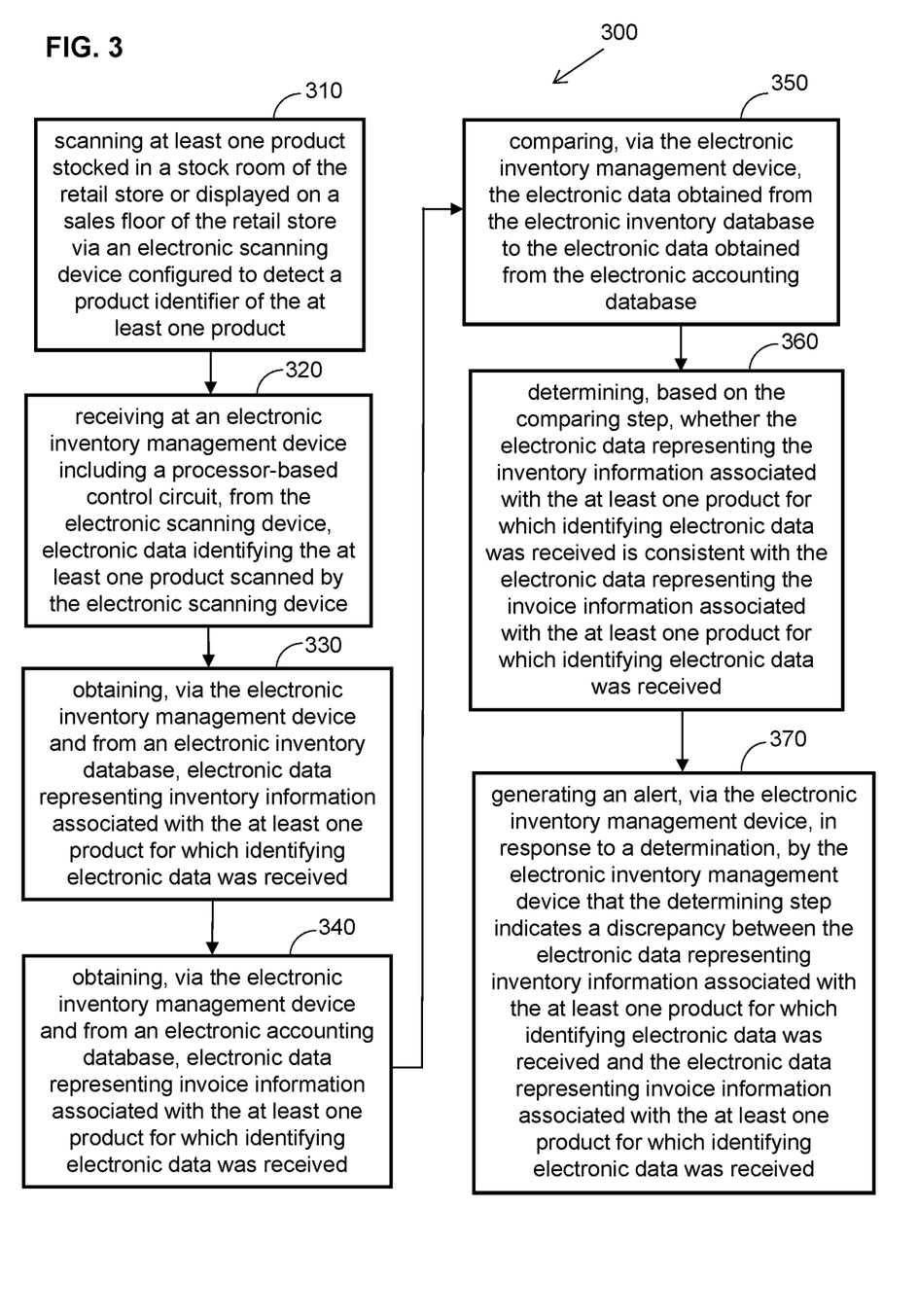
FIG. 3 is a flow diagram of a process of detecting products at a retail store that were mis-shipped, mis-invoiced, or erroneously un-invoiced to the retail store in accordance with some embodiments.

With reference to FIGS. 1-3, one method 300 of operation of the system 100 for detecting products 190 at a retail store 110 that were mis-shipped, improperly invoiced, or not invoiced to the retail store 110 will now be described. While the method 300 is described in the context of the system 100 of FIG. 1, it will be appreciated that embodiments of the method 300 may be implemented not only in the system 100, but in other systems.

The exemplary method 300 shown in FIG. 3 includes scanning one or more products 190 stocked in a stock room 170 of the retail store 110 or displayed on a sales floor 180 of the retail store 110 via an electronic scanning device 130 configured to detect a product identifier 192 of the product 190 (step 310). As discussed above, the electronic scanning device 130 may include one or more sensors/readers configured to recognize one or more product identifiers 192 (e.g., a barcode, QR code, RFID, SKU, NFC, and the like). In one aspect, as a worker carrying a hand-held electronic scanning device 130 walks in proximity to the product display shelves (e.g., within an aisle) on the sales floor 180 of the retail store 110, the electronic scanning device 130 scans the products 190 and detects product identifiers 192 thereon. As discussed above, the electronic scanning device 130 may be alternatively implemented as an autonomous ground vehicle configured to move around the stock room 170 and/or sales floor 180 of the retail store 110 and scan the products 190 stocked in the stock room 170 and/or sales floor 180.

In some aspects, after the electronic scanning device 130 scans the products 190 and acquires electronic data representative of the product identifiers 192 of the scanned products 190, the electronic scanning device 130 transmits such data over the network 160 to the electronic inventory management device 120. To that end, the exemplary method of FIG. 3 includes receiving at an electronic inventory management device 120 including a processor-based control circuit 210, from the electronic scanning device 130, electronic data identifying one or more products 190 scanned by the electronic scanning device 130 (step 320).

As discussed above, in some embodiments, the electronic inventory database 140 records and stores identifying data (e.g., serial number, UPC code, or the like) associated with every product 190 stocked at the retail store 110. In some embodiments, when stocking products 190 onto their respective storage and/or display locations (e.g., in a storage bin in a stock room 170, or on a shelf on the sales floor 180), or when receiving the products 190 in a product receiving area of the retail store 110 after a delivery, the workers of the retail store 110 scan the products 190 via the electronic scanning device 130, which causes the electronic scanning device 130 to transmit data including the product identifier 192 of each scanned product 190 to the electronic inventory database 140, such that the electronic inventory database 140 maintains a real-time list of products 190 in stock at the retail store. In other words, the initial scanning of the product identifier 192 of the product 190 by the electronic scanning device 130 during the stocking of the product 190 by the worker results in the electronic scanning device 130 transmitting electronic data representing the scanned product identifier 192 of the product 190 via the network 160 to the electronic inventory database 140 for storage and association with the product 190, and in some aspects, for future correlation, by the electronic inventory management device 120, with the invoice data stored in the electronic inventory database 140 in association with the product 190.

The exemplary method 300 of FIG. 3 further includes obtaining via the electronic inventory management device 120, from the electronic inventory database 140, electronic data representing inventory information associated with one or more product 190 for which identifying electronic data was received as a result of a scan of the product 190 via the electronic scanning device 130) (step 330). Similarly, the method 300 of FIG. 3 also includes obtaining via the electronic inventory management device 120, from the electronic accounting database 150, electronic data representing invoice information associated with this product 190 (step 340). After the inventory information is obtained from the electronic inventory database 140 and the accounting information is obtained from the electronic accounting database 150, the method 300 of FIG. 3 further includes comparing, via the electronic inventory management device 120, the electronic data obtained from the electronic inventory database 140 to the electronic data obtained from the electronic accounting database 150 (step 350). As described above, this comparison is aimed at detecting whether there are any discrepancies between the electronic inventory data and the electronic accounting data.

In some embodiments, such a comparison of the electronic inventory data associated with the product 190 to the electronic invoice data associated with the product 190 enables the control circuit 210 of the electronic inventory management device 120 to determine whether the electronic inventory data and the electronic invoice data associated with the product 190 are consistent with each other. To that end, the method 300 of FIG. 3 includes determining, based on the comparing step, whether the electronic data representing the inventory information associated with the product 190 for which identifying electronic data was received is consistent with the electronic data representing the invoice information associated with this product 190 (step 360). Several triggering factors and different techniques for detecting discrepancies between the inventory data and the accounting data are described above and will not be reproduced again here.

In some embodiments, if the inventory data and the invoice data associated with the product 190 are not consistent with each other, the electronic inventory management device 120 generates an alert. In particular, the exemplary method 300 of FIG. 3 includes generating an alert, via the electronic inventory management device 120, in response to a determination, by the electronic inventory management device 120 that the determining step indicates a discrepancy between the electronic data representing inventory information associated with the scanned product 190 and the electronic data representing invoice information associated with the product 190 (step 370). In some embodiments, the alert generated by the electronic inventory management device 120 triggers remedial measures including but not limited to updates to the electronic inventory database 140 and/or electronic invoice database 150, requests for shipment of products 190 to their correct destinations, and/or requests for new or corrected invoices.

The systems and methods described herein analyze products in stock at retail stores and detect products that were either improperly invoiced and/or improperly shipped to the retail store, as well as products that were erroneously not invoiced to the retail store. The methods and systems described herein significantly increase the efficiency and timeliness with which such errors can be detected by the retail stores, thereby enabling the retail stores to take responsive measures, and adjust their inventory and/or accounting databases accordingly, thereby advantageously providing for efficient inventory management at a lower cost for the retailer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting products at a retail store that were mis-shipped to the retail store or not invoiced to the retail store, the system comprising:
   a stationary electronic scanning device mounted to a support proximate a product shelf in a stock room of the retail store or proximate a product shelf on a sales floor of the retail store and configured, at one or more predetermined intervals of time following delivery of a shipment of at least one product to the retail store, to scan the at least one product stocked on the product shelf in the stock room of the retail store or displayed on the product shelf on the sales floor of the retail store, the electronic scanning device including at least one sensor configured to detect a product identifier of the at least one product during the scan;
   an electronic inventory management device including a processor-based control circuit and configured to receive, from the electronic scanning device and at the one or more predetermined intervals of time following delivery of the shipment of the at least one product to the retail store, electronic data identifying the at least one product scanned by the electronic scanning device,
   an electronic inventory database configured to store electronic data representing inventory information associated with the at least one product for which identifying electronic data was received;
   an electronic accounting database configured to store electronic data representing invoice information associated with the at least one product for which the identifying electronic data was received;
   wherein the electronic inventory management device is configured, in response to receipt, from the electronic scanning device and at the one or more predetermined intervals of time following delivery of the shipment of the at least one product to the retail store, of the electronic data identifying the at least one product scanned by the electronic scanning device, to:
      obtain, from the electronic inventory database, the electronic data representing the inventory information associated with the at least one product for which identifying electronic data was received;
      obtain, from the electronic accounting database, the electronic data representing the invoice information associated with the at least one product for which identifying electronic data was received;
      compare the electronic data obtained from the electronic inventory database to the electronic data obtained from the electronic accounting database;
      determine whether the electronic data representing the inventory information associated with the at least one product for which identifying electronic data was received is consistent with the electronic data representing the invoice information associated with the at least one product for which identifying electronic data was received; and
      generate an alert, in response to a determination, by the electronic inventory management device, that a discrepancy exists between the electronic data representing inventory information associated with the at least one product for which the identifying electronic data was received and the electronic data representing the invoice information associated with the at least one product for which the identifying electronic data was received.

2. The system of claim 1, wherein the electronic inventory management device is configured to obtain, from the electronic inventory database, electronic data indicating: an initial inventory of the at least one product at the retail store at a start of a selected predetermined interval of time; a total number of units of the at least one product shipped to the retail store from the start of the selected predetermined interval of time to a present time; a total number of units of the at least one product sold at the retail store from the start of the selected predetermined interval of time to the present time; and a total number of units of the at least one product in stock at the retail store at the present time.

3. The system of claim 2, wherein the electronic inventory management device is configured to:
   add the initial inventory of the at least one product at the retail store at a start of a selected predetermined interval of time to the total number of units of the at least one product shipped to the retail store from the start of the selected predetermined interval of time to a present time to obtain a first sum;
   add the total number of units of the at least one product sold at the retail store from the start of the selected predetermined interval of time to the present time to the total number of units of the at least one product in stock at the retail store at the present time to obtain a second sum; and
   compare the first sum to the second sum.

4. The system of claim 3, wherein the electronic inventory management device is configured to:
   determine that the electronic data representing the inventory information associated with the at least one product for which identifying electronic data was received is not consistent with the electronic data representing the invoice information associated with the at least one product for which identifying electronic data was received when the second sum is greater than the first sum; and
   determine that the electronic data representing the inventory information associated with the at least one product for which identifying electronic data was received is consistent with the electronic data representing the invoice information associated with the at least one product for which identifying electronic data was received when the second sum is less than the first sum.

5. The system of claim 1, wherein the electronic inventory management device is configured to:
   obtain electronic data indicating: a total number of units of the at least one product in stock at the retail store at the present time and a cost to the retail store associated with each of the units of the at least one product in stock at the retail store;
   obtain electronic data indicating a total book inventory amount associated with the units of the at least one product in stock at the retail store; and
   subtract a product of the total number of units of the at least one product in stock at the retail store at the present time and the cost to the retail store associated with each of the units of the at least one product in stock at the retail store from the total book inventory amount associated with the units of the at least one product in stock at the retail store.

6. The system of claim 5, wherein the electronic inventory management device is configured to:

determine that the electronic data representing the inventory information associated with the at least one product for which identifying electronic data was received is not consistent with the electronic data representing the invoice information associated with the at least one product for which identifying electronic data was received when the subtracting step results in a number less than zero; and determine that the electronic data representing the inventory information associated with the at least one product for which identifying electronic data was received is consistent with the electronic data representing the invoice information associated with the at least one product for which identifying electronic data was received when the subtracting step results in zero.

7. The system of claim 1, wherein the electronic inventory management device is configured to:

analyze the invoice information associated with the at least one product for which identifying electronic data was received;

detect, in the invoice information, an indication that the invoice information is invalid with respect to the retail store where the at least one product was scanned by the electronic device; and adjust, in the electronic inventory database, the inventory information associated with the at least one product for which identifying electronic data was received in order to correct for the detected invalid invoice information.

8. The system of claim 1, wherein the electronic inventory management device is configured to:

analyze the invoice information associated with the at least one product for which identifying electronic data was received;

detect, in the invoice information, an indication that the invoice information does not reflect that the at least one product scanned by the electronic device at the retail store was invoiced to the retail store; and adjust, in the electronic inventory database, the inventory information associated with the at least one product for which identifying electronic data was received in order to correct for a lack of an invoice to the retail store for the at least one product for which identifying electronic data was received.

9. The system of claim 1, wherein the electronic inventory management device is configured, in response to generation of the alert, to adjust the inventory information associated with the at least one product for which identifying electronic data was received in order to correct the discrepancy between the electronic data representing inventory information associated with the at least one product for which identifying electronic data was received and the electronic data representing invoice information associated with the at least one product for which identifying electronic data was received.

10. A method for detecting products at a retail store that were mis-shipped to the retail store or not invoiced to the retail store, the method comprising:

scanning, at one or more predetermined intervals of time following delivery of a shipment of at least one product to the retail store, at least one product stocked on a product shelf in a stock room of the retail store or displayed on a product shelf on a sales floor of the retail store via a stationary electronic scanning device mounted to a support proximate the product shelf in a stock room of the retail store or proximate the product shelf on the sales floor of the retail store and configured to scan the at least one product, the electronic scanning device including at least one sensor configured to detect a product identifier of the at least one product during the scanning;

receiving, at an electronic inventory management device including a processor-based control circuit and from the electronic scanning device at the one or more predetermined intervals of time following delivery of the shipment of the at least one product to the retail store, electronic data identifying the at least one product scanned by the electronic scanning device;

providing an electronic inventory database configured to store electronic data representing inventory information associated with the at least one product for which identifying electronic data was received;

providing an electronic accounting database configured to store electronic data representing invoice information associated with the at least one product for which identifying electronic data was received;

in response to receipt, from the electronic scanning device and at the one or more predetermined intervals of time following delivery of the shipment of the at least one product to the retail store, of the electronic data identifying the at least one product scanned by the electronic scanning device, by the electronic inventory management device:

obtaining, from the electronic inventory database, the electronic data representing the inventory information associated with the at least one product for which identifying electronic data was received;

obtaining, from the electronic accounting database, the electronic data representing the invoice information associated with the at least one product for which identifying electronic data was received;

comparing, the electronic data obtained from the electronic inventory database to the electronic data obtained from the electronic accounting database;

determining, based on the comparing step, whether the electronic data representing the inventory information associated with the at least one product for which identifying electronic data was received is consistent with the electronic data representing the invoice information associated with the at least one product for which identifying electronic data was received; and generating an alert, via the electronic inventory management device, in response to a determination, by the electronic inventory management device, that the determining step indicates a discrepancy between the electronic data representing inventory information associated with the at least one product for which the identifying electronic data was received and the electronic data representing the invoice information associated with the at least one product for which the identifying electronic data was received.

11. The method of claim 10, wherein the obtaining electronic data representing inventory information associated with the at least one product for which identifying electronic data was received further comprises obtaining electronic data indicating: an initial inventory of the at least one product at the retail store at a start of a selected predetermined interval of time; a total number of units of the at least one product shipped to the retail store from the start of the selected predetermined interval of time to a present time; a total number of units of the at least one product sold at the retail store from the start of the selected predetermined interval of time to the present time; and a total number of units of the at least one product in stock at the retail store at the present time.

12. The method of claim 11, wherein the comparing step further comprises:
  adding the initial inventory of the at least one product at the retail store at a start of a selected predetermined interval of time to the total number of units of the at least one product shipped to the retail store from the start of the selected predetermined interval of time to a present time to obtain a first sum;
  adding the total number of units of the at least one product sold at the retail store from the start of the selected predetermined interval of time to the present time to the total number of units of the at least one product in stock at the retail store at the present time to obtain a second sum; and
  comparing the first sum to the second sum.

13. The method of claim 12, wherein the determining step further comprises:
  determining that the electronic data representing the inventory information associated with the at least one product for which identifying electronic data was received is not consistent with the electronic data representing the invoice information associated with the at least one product for which identifying electronic data was received when the second sum is greater than the first sum; and
  determining that the electronic data representing the inventory information associated with the at least one product for which identifying electronic data was received is consistent with the electronic data representing the invoice information associated with the at least one product for which identifying electronic data was received when the second sum is less than the first sum.

14. The method of claim 10,
  wherein the obtaining, from the electronic inventory database, of the electronic data representing inventory information associated with the at least one product for which identifying electronic data was received further comprises obtaining electronic data indicating: a total number of units of the at least one product in stock at the retail store at the present time and a cost to the retail store associated with each of the units of the at least one product in stock at the retail store;
  wherein the obtaining, from the electronic accounting database, of the electronic data representing invoice information associated with the at least one product for which identifying electronic data was received further comprises obtaining electronic data indicating a total book inventory amount associated with the units of the at least one product in stock at the retail store; and
  further comprising subtracting a product of the total number of units of the at least one product in stock at the retail store at the present time and the cost to the retail store associated with each of the units of the at least one product in stock at the retail store from the total book inventory amount associated with the units of the at least one product in stock at the retail store.

15. The method of claim 14, wherein the determining step further comprises:
  determining that the electronic data representing the inventory information associated with the at least one product for which identifying electronic data was received is not consistent with the electronic data representing the invoice information associated with the at least one product for which identifying electronic data was received when the subtracting step results in a number less than zero; and
  determining that the electronic data representing the inventory information associated with the at least one product for which identifying electronic data was received is consistent with the electronic data representing the invoice information associated with the at least one product for which identifying electronic data was received when the subtracting step results in zero.

16. The method of claim 10, wherein the determining step further comprises:
  analyzing, via the electronic inventory management device, the invoice information associated with the at least one product for which identifying electronic data was received;
  detecting, in the invoice information, an indication that the invoice information is invalid with respect to the retail store where the at least one product was scanned by the electronic device; and
  adjusting, in the electronic inventory database, the inventory information associated with the at least one product for which identifying electronic data was received in order to correct for the detected invalid invoice information.

17. The method of claim 10, wherein the determining step further comprises:
  analyzing, via the electronic inventory management device, the invoice information associated with the at least one product for which identifying electronic data was received;
  detecting, in the invoice information, an indication that the invoice information does not reflect that the at least one product scanned by the electronic device at the retail store was invoiced to the retail store; and
  adjusting, in the electronic inventory database, the inventory information associated with the at least one product for which identifying electronic data was received in order to correct for a lack of an invoice to the retail store for the at least one product for which identifying electronic data was received.

18. The method of claim 10, wherein the generating an alert step further comprises adjusting the inventory information associated with the at least one product for which identifying electronic data was received in order to correct the discrepancy between the electronic data representing inventory information associated with the at least one product for which identifying electronic data was received and the electronic data representing invoice information associated with the at least one product for which identifying electronic data was received.

\* \* \* \* \*